United States Patent [19]
Itoi

[11] Patent Number: 5,995,458
[45] Date of Patent: Nov. 30, 1999

[54] METHOD AND APPARATUS FOR SCANNING AN OPTICAL DISK USING TRACK JUMPING

[75] Inventor: Satoshi Itoi, Tokyo, Japan

[73] Assignee: NEC Corporation, Tokyo, Japan

[21] Appl. No.: 08/919,794

[22] Filed: Aug. 29, 1997

[30] Foreign Application Priority Data

Aug. 30, 1996 [JP] Japan .................................. 8-230185

[51] Int. Cl.⁶ ...................................................... G11B 7/00
[52] U.S. Cl. ................................................ 369/32; 369/54
[58] Field of Search ............................ 369/275.3, 44.13, 369/44.26, 50, 32, 54

[56] References Cited

U.S. PATENT DOCUMENTS

| | | | |
|---|---|---|---|
| 4,539,664 | 9/1985 | Deguchi et al. ............................. | 369/32 |
| 4,814,903 | 3/1989 | Kulakowski et al. ....................... | 369/48 |
| 5,606,546 | 2/1997 | Best et al. ................................... | 369/94 |
| 5,619,387 | 4/1997 | Ottesen et al. .......................... | 369/44.25 |
| 5,650,984 | 7/1997 | Yamaguchi et al. ....................... | 369/32 |
| 5,754,506 | 5/1998 | Nagasawa et al. .................... | 369/44.26 |

FOREIGN PATENT DOCUMENTS

| | | | |
|---|---|---|---|
| 6-274896 | 9/1994 | Japan ....................................... | 369/32 |
| 7-287855 | 10/1995 | Japan . | |

*Primary Examiner*—Nabil Hindi
*Attorney, Agent, or Firm*—Whitham, Curtis & Whitham

[57] ABSTRACT

A method of scanning an optical disk having a land area and a groove area arranged in a double spiral configuration is disclosed. Either the land area or the groove area is continuously scanned radially inward or radially outward. The groove area, if the land area is so scanned first, or the land area, if the groove area is so scanned first, is scanned with a track jump repeated outward or inward from the end of the previous scanning. In this manner, one of the land area and groove area is subjected to continuous scanning without any track jump while the other area is subjected to scanning causing a track jump to occur within the same area.

11 Claims, 13 Drawing Sheets

| TRACK NO. | FRAME NO. | | |
|---|---|---|---|
| 0 | 229 | | |
| 1 | 228 | | |
| 2 | 227 | | |
| 3 | | 226 | CBLK0 |
| 4 | | 226 | |
| 5 | | 225 | |
| 6 | | 224 | |
| 7 | 223 | | |

| 8 | 222 | |
|---|---|---|
| 9 | 221 | |
| 10 | 220 | |
| 11 | 219 | |
| 12 | 218 | CBLK1 |
| 13 | 217 | |
| 14 | 216 | |
| 15 | 215 | |

| 16 | 214 | |
|---|---|---|
| 17 | 213 | |
| 18 | 212 | |
| 19 | 210 | 211 |
| 20 | 209 | CBLK2 |
| 21 | 208 | |
| 22 | 207 | |
| 23 | 206 | |

CBLK3

| 24 | 205 | |
|---|---|---|
| 25 | 203 | 204 |
| 26 | 202 | |
| 27 | 201 | |
| 28 | 200 | |
| 29 | 199 | |
| 30 | 197 | 198 |
| 31 | 196 | |

| 32 | 195 | |
|---|---|---|
| 33 | 193 | 194 |
| 34 | 192 | |
| 35 | 190 | 191 |
| 36 | 189 | |
| 37 | 188 | |
| 38 | 186 | 187 |
| 39 | 185 | |

CBLK4

| TRACK NO. | FRAME NO. | |
|---|---|---|
| 40 | 184 | |
| 41 | 182 | 183 |
| 42 | 181 | |
| 43 | 179 | 180 | CBLK5
| 44 | 178 | |
| 45 | 176 | 177 |
| 46 | 175 | |
| 47 | 173 | 174 |

| 48 | 171 | 172 | |
|---|---|---|---|
| 49 | 170 | | |
| 50 | 168 | 169 | |
| 51 | 167 | | |
| 52 | 165 | 166 | CBLK6 |
| 53 | 163 | 164 | |
| 54 | 162 | | |
| 55 | 160 | 161 | |

| 56 | 158 | 159 | |
|---|---|---|---|
| 57 | 157 | | |
| 58 | 155 | 156 | |
| 59 | 153 | 154 | |
| 60 | 151 | 152 | CBLK7 |
| 61 | 149 | 150 | |
| 62 | 148 | | |
| 63 | 146 | 147 | |

| 64 | 144 | 145 | |
|---|---|---|---|
| 65 | 142 | 143 | |
| 66 | 140 | 141 | |
| 67 | 139 | | |
| 68 | 137 | 138 | CBLK8 |
| 69 | 135 | 136 | |
| 70 | 133 | 134 | |
| 71 | 131 | 132 | |

| 72 | 129 | 130 | |
|---|---|---|---|
| 73 | 127 | 128 | |
| 74 | 125 | 126 | |
| 75 | 123 | 124 | |
| 76 | 121 | 122 | CBLK9 |
| 77 | 119 | 120 | |
| 78 | 117 | 118 | |
| 79 | 115 | 116 | |

| | TJ 0 | TJ 0 | TJ 1 | TJ 1 | TJ 2 | TJ 2 | TJ 3 | TJ 3 | TJ 4 | TJ 4 | TJ 5 | TJ 5 |
|---|---|---|---|---|---|---|---|---|---|---|---|---|
| | 0 | 1 | 2 | 3 | 4 | 5 | 7 | 8 | 10 | 11 | 14 | 17 |
| | | | | | | 6 | | 9 | 12 | 13 | 15 | |
| | | | | | | | | | | | 16 | |

LAND: 0, 1, 2, 3, 4, 5
GROOVE: 0, 1, 2, 3, 4, 5

METHOD AND APPARATUS FOR SCANNING AN OPTICAL DISK USING TRACK JUMPING

BACKGROUND OF THE INVENTION

1. Field of the Invention

The present invention relates to a method of scanning an optical disk, and an apparatus therefor.

2. Description of the Related Art

Disk apparatuses known in the art include one capable of recording digital data or digital images, speeches, systems or similar data in magnet-optical disks or optical disks including phase change disks. For this type of disk apparatus, a recording system implementing both high density recording and high speed search at the same time with a single head is desirable. Today, a CAV recording system, a CLV recording system and an MCAV recording system are available with an optical disk type disk drive which records digital data or video and audio data in optical disks.

The CAV system records data in an optical disk while causing it to spin at a constant speed. This system realizes high speed search without regard to a head device because the rotation speed is constant. In addition, the system implements the simultaneous reproduction of different positions at the time of recording and simplifies a spindle servo. However, this system is not feasible for high density recording because the shortest record wavelength is determined by the innermost circumference.

The CLV featuring a constant linear velocity maintains the relative velocity constant over the entire area of a disk and therefore maintains the record wavelength constant. This kind of system is feasible for high density recording. However, because the rotation speed of the disk varies in accordance with the position of a head, the system is not feasible for high speed search. Further, the system cannot implement the simultaneous reproduction of different positions and needs a sophisticated spindle servo.

The MCAV system, integrating the merits of the CAV and CLV systems, maintains the rotation speed of a disk constant and increases the amount of data for a track in proportion to the radius of the disk. Because the rotation speed is constant, the record bit rate is increased in proportion to the radius of a disk (variable clock recording and variable clock reproduction). This kind of system is capable of effecting high speed search because the record wavelength is constant over the entire area of a disk and because the number of disk rotation data is constant. Further, the system is capable of reproducing different positions at the same time during recording and simplifying a spindle servo.

A system of the type recording data by using both the land portions and groove portions of disk tracks, i.e., a so-called land/groove recording system is also available although it is different from a recording system. The land/groove recording system doubles the recording density particular to conventional land recording or groove recording and thereby increases the recording time. Thereby, by combining the MCAV system and land/groove recording system, it is possible to realize high density and advanced function at the same time.

FIG. 12 shows how a head scans a disk in the combined MCAV and land/groove recording system. FIG. 13 shows the order of data (corresponding to frames which will be described) actually scanned. As shown in FIG. 12, a head repeatedly jumps one track backward from a land track portion to a groove portion, or vice versa. As a result, the data shown in FIG. 13 are sequentially recorded in a disk. In FIG. 13, the numerals indicate, e.g., the frame numbers of a moving picture. This allows, e.g., a moving picture to be continuously recorded in both the land portion and groove portion of a disk.

However, the above conventional recording system has a problem that the jump from a land portion to a groove portion and the jump from a groove portion to a land portion are not practicable without resorting to complicated adjustment. Another problem is that because the two different kinds of track jumps are replaced every track, an amplifier gain, among others, must be switched at a high speed. It is therefore extremely difficult to realize stable track jumps.

Japanese Patent Laid-Open Publication No. 7-282855 proposes an arrangement for implementing a rapid jump from a land track to a groove track. However, the arrangement taught in this document is too sophisticated in configuration to be practiced.

SUMMARY OF THE INVENTION

It is therefore an object of the present invention to provide a simple optical disk scanning method realizing high density recording and high speed search at the same time with a single head, and an apparatus therefor.

In accordance with the present invention, a method of scanning an optical disk having a land area and a groove area in a double spiral configuration scans one of the two areas continuously radially inward or radially outward, and scans the other area inward or outward from the end of the scanning of the one area while repeating a track jump. The groove area, if the land area is scanned first, or the land area, if the groove area is scanned first, is scanned outward or inward from the end of the scanning of the previous area. That is, one of the land area and groove area is continuously scanned without any jump. In the area needing track jumps, the track jump occurs from the land area to the land area or from the groove area to the groove area.

The present invention is practicable at least the land/groove recording is used. The combination of the land/groove recording and MCAV recording will further increase the record density and will allow a single head to realize high density recording and high speed search at the same time.

In the land area or the groove area where the track jump occurs, a two-track jump may be repeated every time a track is scanned, or a one-track jump may be effected every time half a track is scanned. While the former scheme reduces the number of times of track jump while the latter scheme reduces the width of a jump although increasing the frequency of track jump.

A track marker may be broader in the land area or the groove area where the track jump occurs than in the other area. The words "track marker" refers to an interval area for a track jump existing in each track or a preamble area for locking synchronization and clock. In the area to be continuously scanned, such track markers can be readily read while a head is in smooth movement. However, in the other area needing track jumps, the track markers must be read just after the movement of the head. The broader markers can be surely read even in the area needing track jumps. Of course, the track markers may each be either the interval area or the preamble area or may be any other suitable area, e.g., an area for identifying a track.

Further, in an apparatus of the present invention for scanning an optical disk having a land area and a groove area arranged in a double spiral configuration, either one of the land area and groove area is continuously scanned radially inward or radially outward, and the other area is scanned from the end of the scanning of the one of the two areas outward or radially inward while repeating a track jump.

BRIEF DESCRIPTION OF THE DRAWINGS

The above and other objects, features and advantages of the present invention will become apparent from the following detailed description taken with the accompanying drawings in which:

FIG. 1 shows a relation between track numbers and frame numbers assigned to land tracks to be scanned by a method embodying the present invention;

FIG. 2 shows a relation between track numbers and frame numbers assigned to groove tracks to be also scanned by the same method;

FIG. 3 shows a relation between track numbers and frame numbers assigned to groove tracks to be scanned by a modification of the above embodiment;

FIG. 13 shows a relation between track numbers and frame numbers assigned to the tracks shown in FIG. 12;

DESCRIPTION OF THE PREFERRED EMBODIMENTS

Figure 4:
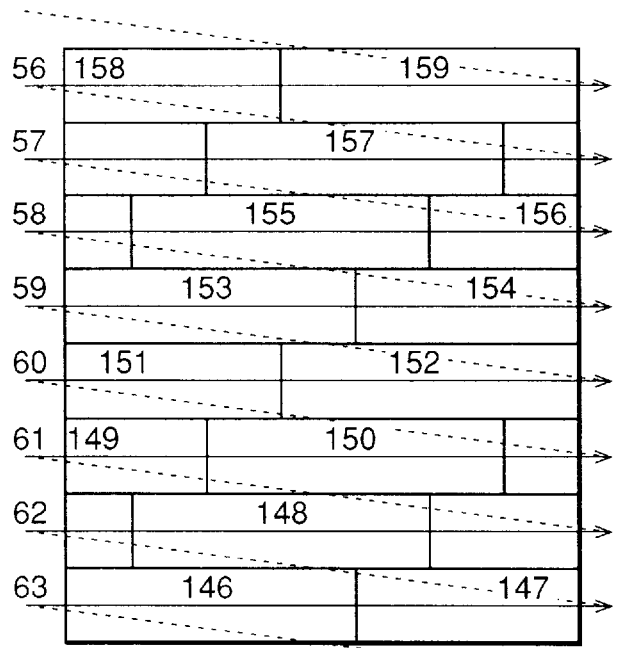
FIG. 4 shows the order in which the tracks of a clock block CBLK7 shown in FIG. 2 are scanned.

Preferred embodiments of the method and apparatus for scanning an optical disk in accordance with the present invention will be described hereinafter.

In the embodiments to be described, assume the following specific conditions. Data to be recorded in an optical disk are image data coded with a fixed length in a frame, and a single frame has eight blocks (sync block SB hereafter). Eighty land tracks and eighty groove tracks, i.e., 160 tracks in total, are available with an optical disk. The disk is equally divided into ten record areas (clock blocks CBLK hereafter) in the track direction, and each clock block CBLK has sixteen tracks. In the radially innermost clock block CBLK, a 7/8 frame of data for a single track, i.e., seven frames of data in total, are recorded in the land track. One frame of data for a single track, i.e., eight frames of data in total are recorded in the land track of a clock block CBLK1. 9/8 frames of data for a single track, i.e., nine frames of data in total, are recorded in the land tracks of a clock block CBLK2. In this manner, the number of record frames for a single track is sequentially increased by ⅛. Finally, two frames of data for a single track, i.e., sixteen frames of data in total are recorded in the land tracks of the radially outermost clock block CBLK9.

Figure 1:
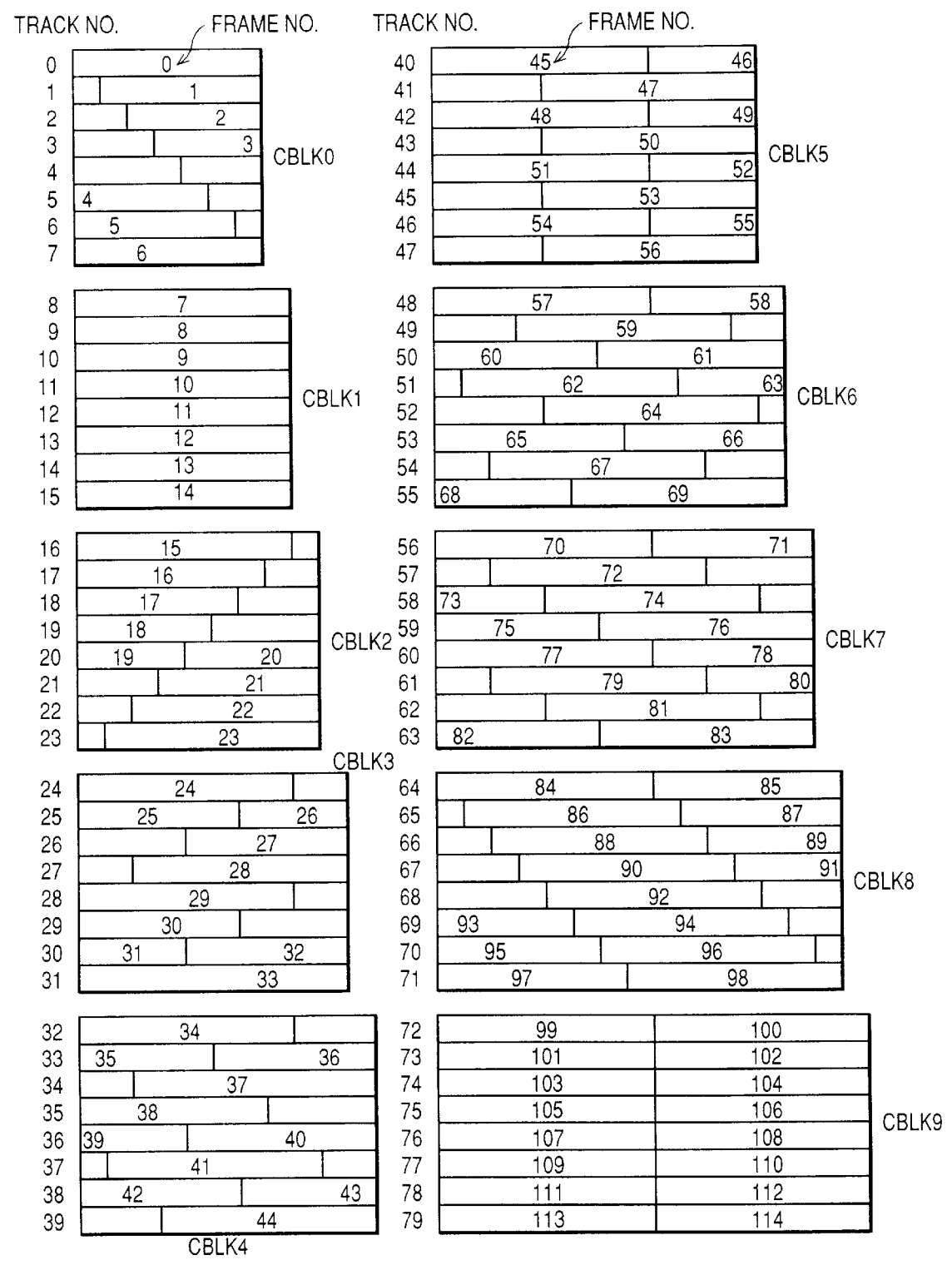

FIG. 1 shows the record track format of the land tracks. In FIG. 1, track numbers are shown at the left-hand side of frames representative of the clock blocks. In each frame, frame numbers to be recorded in the tracks are shown. As shown, by scanning only the land tracks, it is possible to record and reproduce frames #0 through #114, i.e., 115 frames in total without any track jump.

After recording data in the outermost land track, an optical head jumps one track backward to the leading end of the outermost groove track and again starts recording data. As for groove tracks, the optical head is assumed to jump one track backward every time it scans one half of a track. In this condition, the head records two frames of data in each groove track of the outermost clock block CBLK9, i.e., sixteen frames of data in total. Then, the head records 15/8 frames of data in each groove track of a clock block CBLK 8, i.e., fifteen frames of data in total. In this manner, the number of record frames for a track is sequentially reduced by ⅛ from one clock block CBLK to the next clock block CBLK. The head records a 7/8 frame of data in each groove track of the innermost clock block CBLK0, i.e., seven frames of data in total.

FIG. 2 shows the record track format of the groove tracks. As shown, in the clock block CBLK 9, the head starts writing a frame #115 at the leading end of a groove track #79. After recording the frame #115 and the subsequent frame #116, the head jumps two groove tracks backward to the leading end of a track #78. After recording frames #117 and #118, the head jumps two groove tracks backward to the leading end of a track #77 and records frames #119 and #120. The head repeats such a procedure until it records a frame #130 in a track #72. Subsequently, the head returns to the leading end of a track #71, finishing the clock block CBLK.

As for the next clock block CBLK8, the head records a frame #131 and a major part of a frame #132 in the track #71, jumps two groove tracks backward to the leading end of a track #70, and then records the remaining of the frame #132, a frame #133, and a major part of a frame #134 in the track #70. This is also true with the other clock blocks CBLK8–CBLK0. Finally, the head records a frame #229 in a track #0 of the clock block CBLK0.

To reproduced the data, the head scans the above clock blocks CBLK in the same manner as during recording.

Another specific format for recording data in the groove tracks is as follows. On recording data in the outermost land track, the head jumps one track backward to the leading end of the outermost groove track and again starts recording data. As for the groove tracks, the head is assumed to jump one groove track backward every time it scans one half of a track. In this condition, the head records two frames of data in each groove track of the outermost clock block CBLK9, i.e., sixteen frames of data in total. The head records 15/8 frames of data in each groove track of the clock block CBLK8, i.e., fifteen frames of data in total. In this manner, the number of record frames for a track is sequentially reduced by ⅛ from one clock block CBLK to another clock block CBLK. The head records a 7/8 frame of data in each groove track of the innermost clock block CBLK0, i.e., seven frames of data in total.

Figure 3:
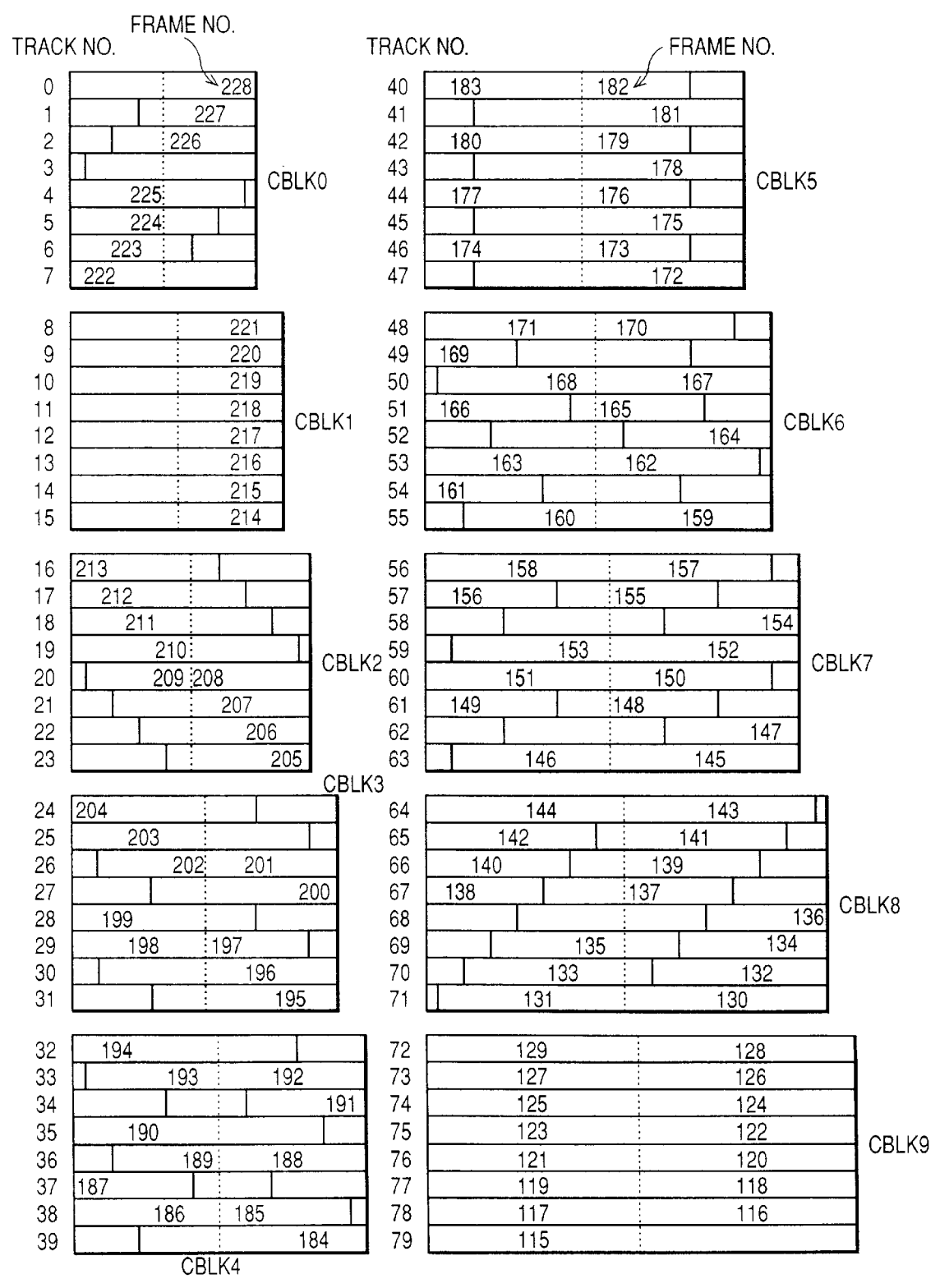

Still another format for recording data in the groove tracks is shown in FIG. 3. As shown, in the clock block CBLK9, the head starts recording the frame #115 at the leading end of the groove track #79. The head records one frame in one half of each groove track. Therefore, on recording data in the frame #115, the head jumps one groove track backward and again starts recording the frame #116 at the center of the track #78. After recording the frame #116, the head jumps one groove track backward, records the frame #117 from the leading end of the track #78, jumps one groove track backward, records the frame #118 from the center of the track #77, jumps one groove track backward, and then records the frame #119 from the leading end of the track #77. The head repeats such a procedure and ends recording the frame #130 at the center of the track #72. Subsequently, the head returns to the center of the track #71, finishing the clock block CBLK9.

Next, as for the clock block CBLK8, the head records a major part of the frame #130 from the center of the track #71, jumps one groove track backward to the leading end of the track #71, and records the remaining part of the frame #130 and a major part of the frame #131 in the track #71. Subsequently, the head jumps one groove track backward, records the remaining part of the frame #131 and a major part of the frame #132 from the center of the track #70, jumps one groove track backward, records the remaining part of the frame #132 and a major part of the frame #133 from the leading end of the track #70, jumps one groove track backward, and then records the remaining part of the frame #133 and a major part of the frame 134 from the center of the track #69. The head repeats such a procedure with the clock blocks CBLK8–CBLK0. Finally, the head records the frame #228 up to the center of the track #0 of the clock block CBLK0.

In FIG. 3, dotted lines drawn at the centers of the tracks each indicates the position where the head jumps one track backward. The head is capable of reproducing the data in the same manner as it records them.

Figure 5:
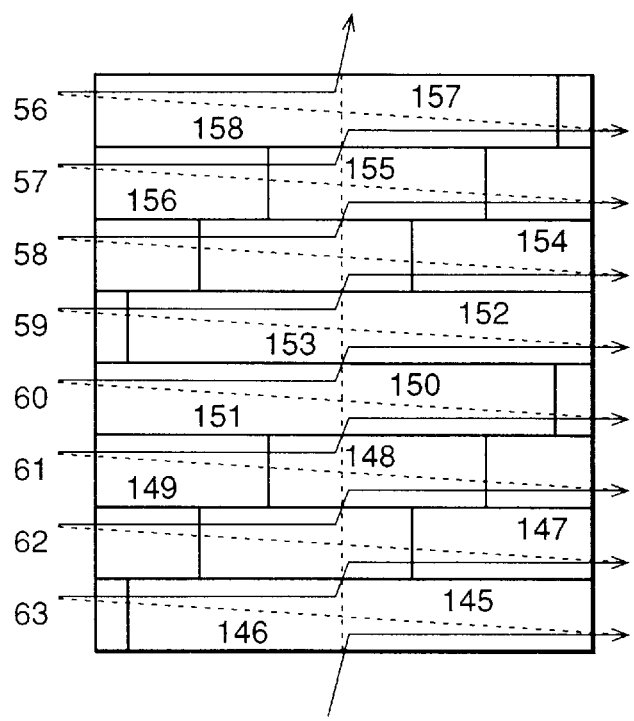
FIG. 5 shows the order in which the tracks of a clock block CBLK7 shown in FIG. 3 are scanned.

How the head scans the clock block CBLK7 shown in FIG. 3 will be described with reference to FIG. 5. As shown, the head records a major part of a frame #145 in the latter half of a track #63, records the remaining part of the frame #145 and a major part of a frame #146 in the former half of the track #63, records the remaining part of the frame #146 and a major part of a frame #147 in the latter half of a track #62, records the remaining part of the frame #147 and a major part of a frame #148 in the former half of the track #62, records the remaining part of the frame 148 and a major part of a frame #149 in the latter half of a track #61, records the remaining part of the frame #149 and a major part of a frame #150 in the former half of the track #61, records the remaining part of the frame #150 and a major part of a frame #151 in the latter half of a track #60, records the remaining part of the frame #151 in the former half of the track #60, records a major part of a frame #152 in the latter half of a track #59, records the remaining part of the frame #152 and a major part of a frame #153 in the former half of the track #59, records the remaining part of the frame #153 and a major part of a frame #154 in the latter half of a frame #58, records the remaining part of the frame #154 and a major part of a frame #155 in the former half of the tack #58, records the remaining part of the frame #155 and a major part of a frame #156 in the latter half of a track #57, records the remaining part of the frame #156 and a major part of a frame #157 in the former half of the tack #57, records the remaining part of the frame #157 and a major part of a frame #158 in the latter half of a track #56, and records the remaining part of the frame #158 in the former half of the track #56.

Figure 6:
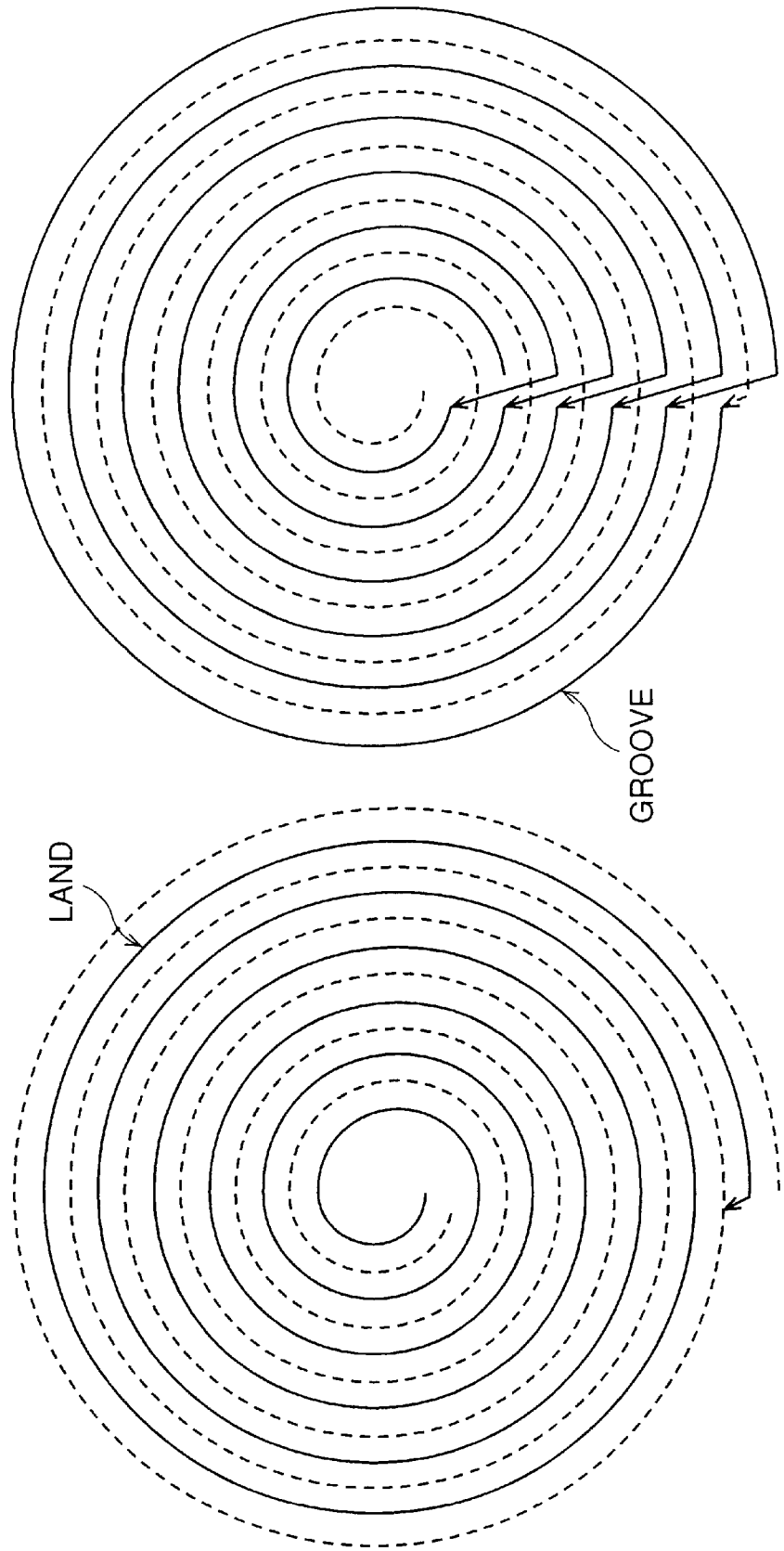
FIGS. 6A and 6B respectively show simplified forms of the land tracks and groove tracks shown in FIG. 2.
Figure 7:
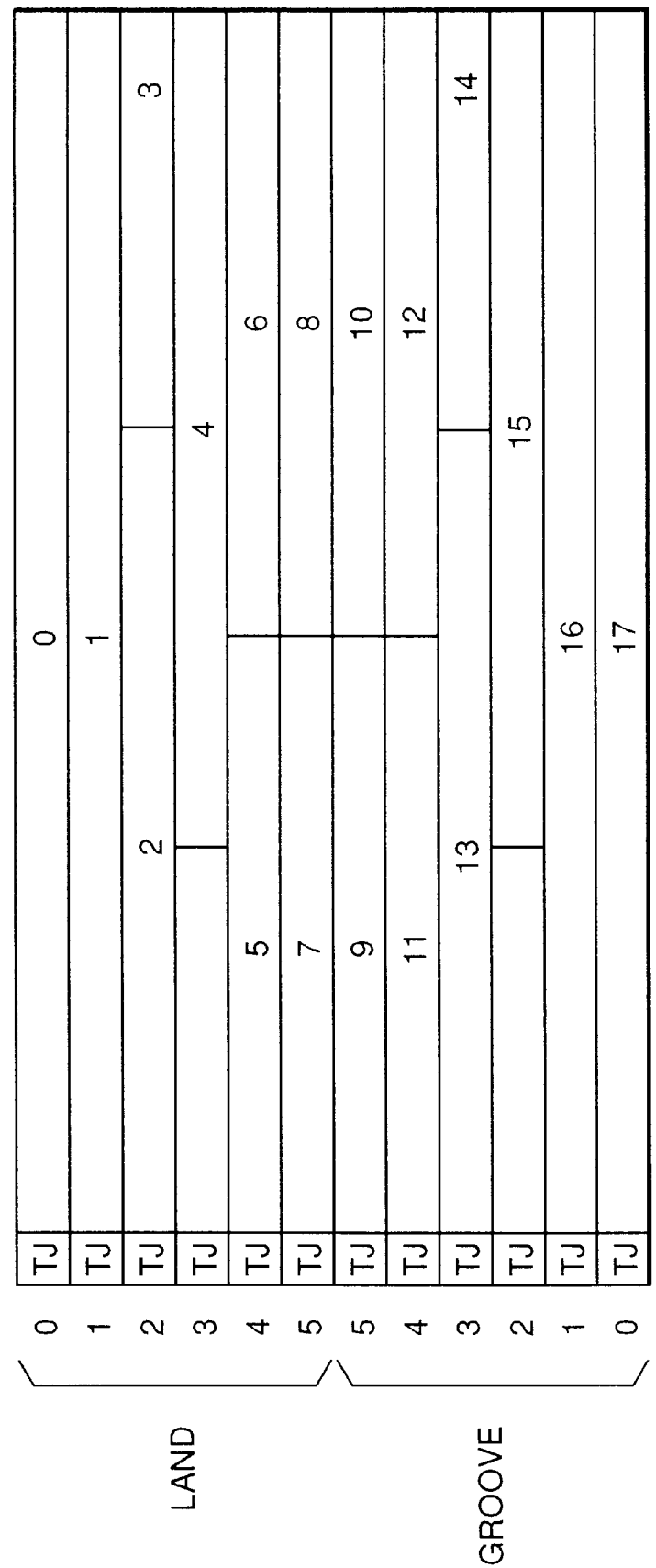
FIG. 7 shows a relation between track numbers and the frame numbers assigned to the land tracks and groove tracks shown in FIGS. 6A and 6B.

FIGS. 6A and 6B show the scanning order of the optical head for implementing the format shown in FIG. 2. Because it is not practical to show all the tracks shown in FIG. 2, only six land tracks and six groove tracks shown in FIG. 7 are illustrated. Assume that the clock block CBLK0 has tracks #0 and #1, that the clock block CBLK1 has tracks #2 and #3, and that the clock block CBLK2 has tracks #4 and #5.

FIG. 6A shows the order in which the head scans the land tracks. As shown, the head records the frame #0 in the land track #0, records the frame #1 in the land track #1, records the frames #2 and #3 in the land track #2, records the frames #3 and #4 in the land track #3, records the frames #5 and #6 in the land track #4, and records the frames #7 and #8 in the land track #5. Then, the head jumps one track backward to the leading end of the groove track #5.

The head scans the groove tracks in the order shown in FIG. 6B. As shown, the head records the frames #9 and #10 in the groove track #5, jumps two groove tracks backward, records the frames #11 and #12 in the groove track #4, jumps two groove tracks backward, records the frames #13 and #14 in the groove track #3, jumps two groove tracks backward, records the frames #14 and #15 in the groove track #2, jumps two groove tracks backward, records the frame #16 in the groove track #1, jumps two groove tracks backward, and records the frame #17 in the groove track #0.

In FIG. 7, a track jump interval, track address, preamble and so forth are collectively labeled TJ.

Figure 8:
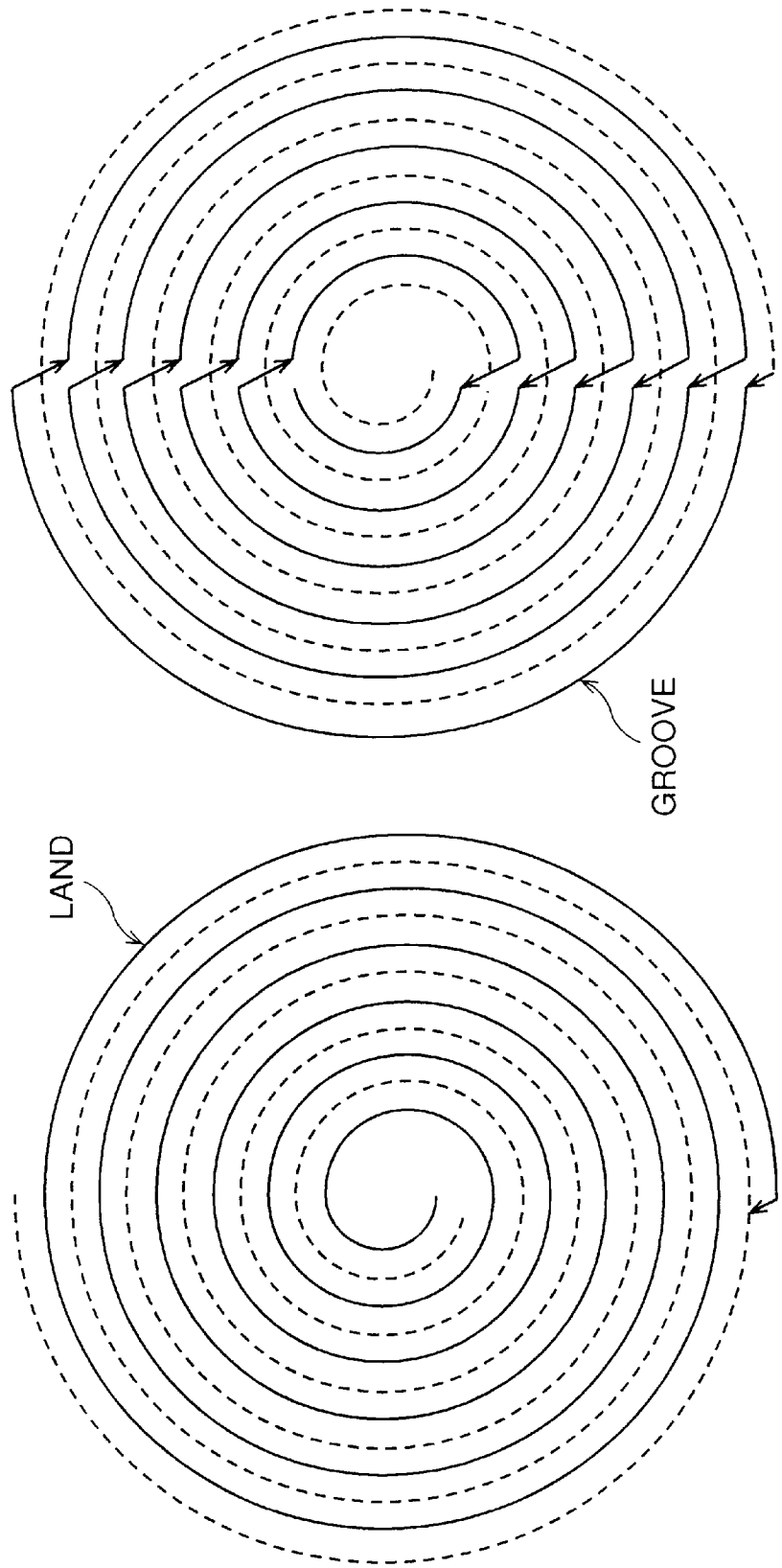
FIGS. 8A and 8B respectively show simplified forms of the land tracks and groove tracks shown in FIG. 3.
Figure 9:
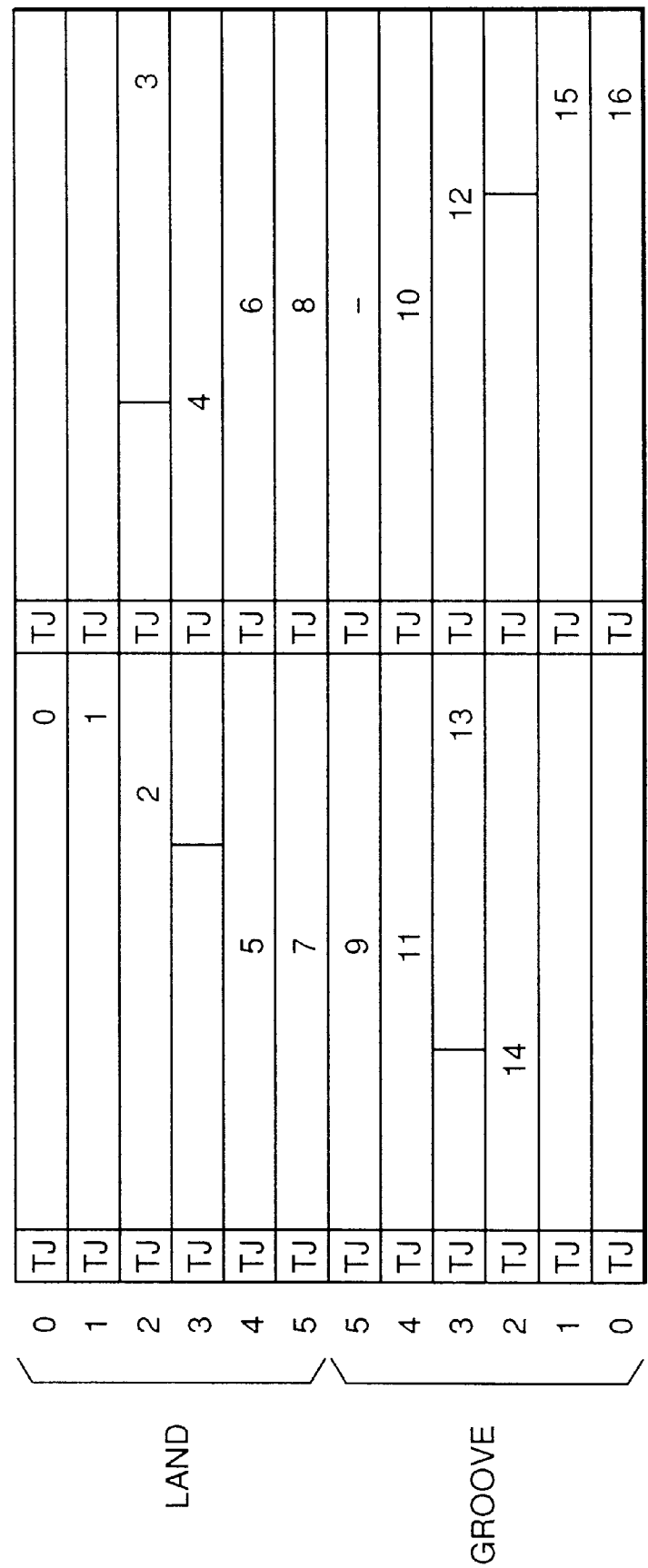
FIG. 9 shows a relation between the track numbers and the frame numbers of FIGS. 8A and 8B.

FIGS. 8A and 8B show the scanning order of the head for implementing the format shown in FIG. 3. Because it is not practical to show all the tracks shown in FIG. 3, only six land tracks and six groove tracks shown in FIG. 9 are illustrated. Again, assume that the clock block CBLK0 has tracks #0 and #1, that the clock block CBLK1 has tracks #2 and #3, and that the clock block CBLK2 has tracks #4 and #5.

FIG. 8A shows how the head scans the land tracks. As shown, the head records the frame #0 in the land track #0, records the frame #1 in the land track 1, records the frames 2 and 3 in the land track #2, records the frames #3 and #4 in the land track #3, records the frames #5 and #6 in the land track #4, records the frames #7 and #8 in the land track 5, and then jumps one land track backward to the leading end of the groove track #5.

FIG. 8B shows how the head scans the groove tracks. As shown, the head records the entire frame #9 from the leading end of the groove track #5, jumps one groove track backward, records the entire frame #10 from the center of the groove track 4, jumps one groove track backward, records the entire frame #11 from the leading end of the groove track 4, jumps one groove track backward, records the former half of the frame 12 from the center of the groove track #3, jumps one groove track backward, records the latter half of the frame #12 and the former half of the frame #13 from the leading end of the groove track #3, jumps one groove track backward, records the latter half of the frame #13 and the former half of the frame #14 from the center of the groove track #2, jumps one groove track backward, records the latter half of the frame #14 from the leading end of the groove track #2, jumps one groove track backward, records the former half of the frame 15 from the center of the groove track #1, jumps one groove track backward, records the latter half of the frame #15 from the leading end of the groove track #1, jumps one groove track backward, records the former half of the frame #16 from the center of the groove track #0, jumps one groove track backward, and then records the latter half of the frame #16 from the leading end of the groove track #0.

In FIG. 9, a track jump interval, track address, preamble and so forth are collectively labeled TJ.

In the foregoing embodiments, the head scans the disk from the innermost land track to the outermost land track without any track jump, and then scans the disk from the outermost groove track to the innermost groove track while jumping one groove track backward at a time. Alternatively, the head may scan the disk from the innermost groove track to the outermost groove track without any track jump, and then scan the disk from the outermost land track to the innermost land track while jumping one land track backward at a time.

Further, the head may scan the disk from the outermost land track to the innermost land track without any track jump, and then scan the disk from the innermost groove track to the outermost groove track while jumping one groove track forward at a time. In addition, the head may scan the disk from the outermost groove track to the innermost groove track without any track jump, and then scan the disk from the innermost land track to the outermost land track while jumping one land track forward at a time.

Figure 10B:
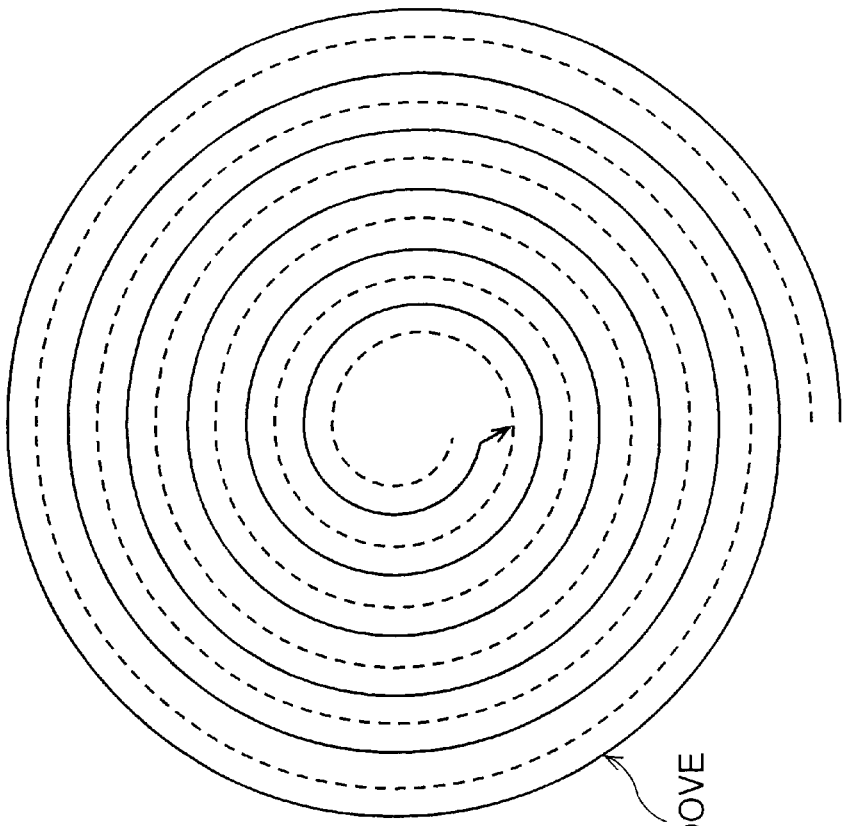
FIGS. 10A and 10B shows land tracks and groove tracks in a condition wherein scanning starts at the radially outermost groove track.
Figure 11A:
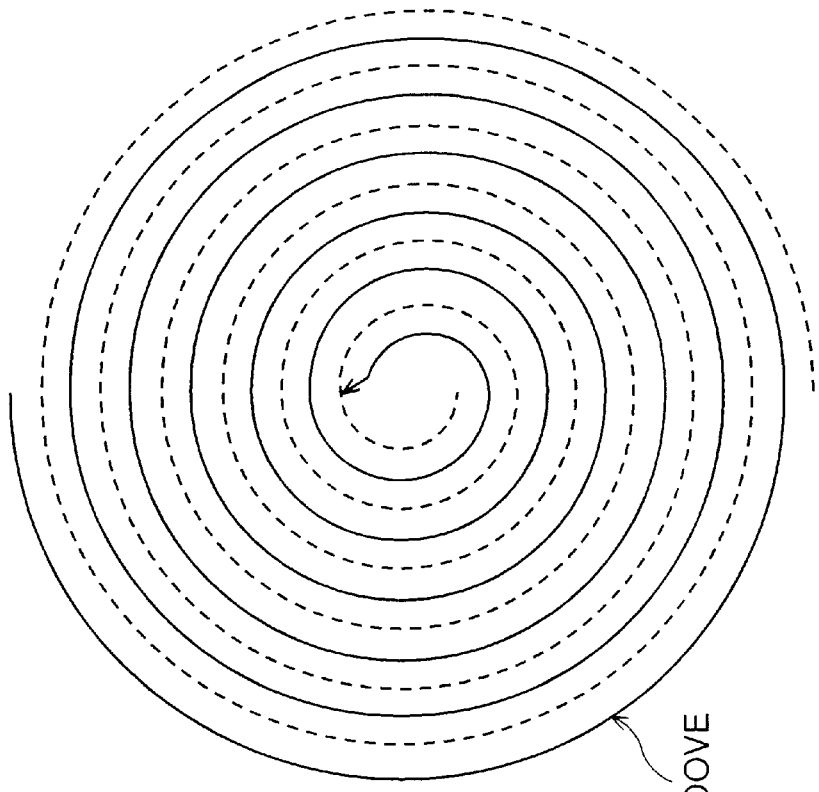
FIGS. 11A and 11B are views similar to FIGS. 10A and 10B, showing a modified procedure.

FIGS. 11A and 10B show another embodiment in which the head scans the disk from the outermost groove track to the innermost groove track without any track jump, and then scans the disk from the innermost land track to the outermost land track while jumping one land track forward at time.

FIG. 10B shows a procedure for scanning the groove tracks. As shown, the head records the frames #0 and #1 in the groove track #5, records the frames #2 and #3 in the groove track #4, records the frames #4 and #5 in the groove track #3, records the frames #5 and #6 in the groove track #2, records the frame #7 in the groove track #1, records the frame #8 in the groove track #0, and then jumps one groove track forward to the leading end of the land track 0.

Figure 10A:
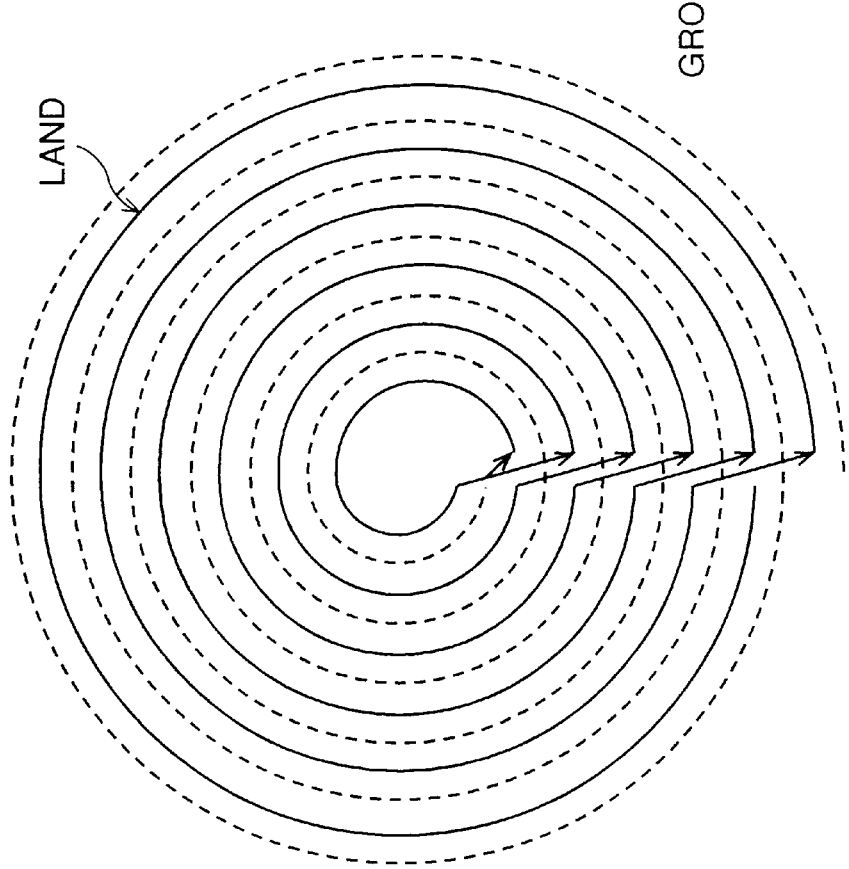

FIG. 10A shows a procedure for scanning the land tracks. As shown, the head records the frame #9 in the land track #0, jumps two land tracks forward, records the frame #10 in the land track #1, jumps two land tracks forward, records the frames #11 and #12 in the land track #2, jumps two land tracks forward, records the frames #12 and #13 in the land track #3, jumps two land tracks forward, records the frames #14 and #15 in the land track #4, jumps two land tracks forward, and then records the frames 16 and #17 in the land track #5.

Figure 11B:
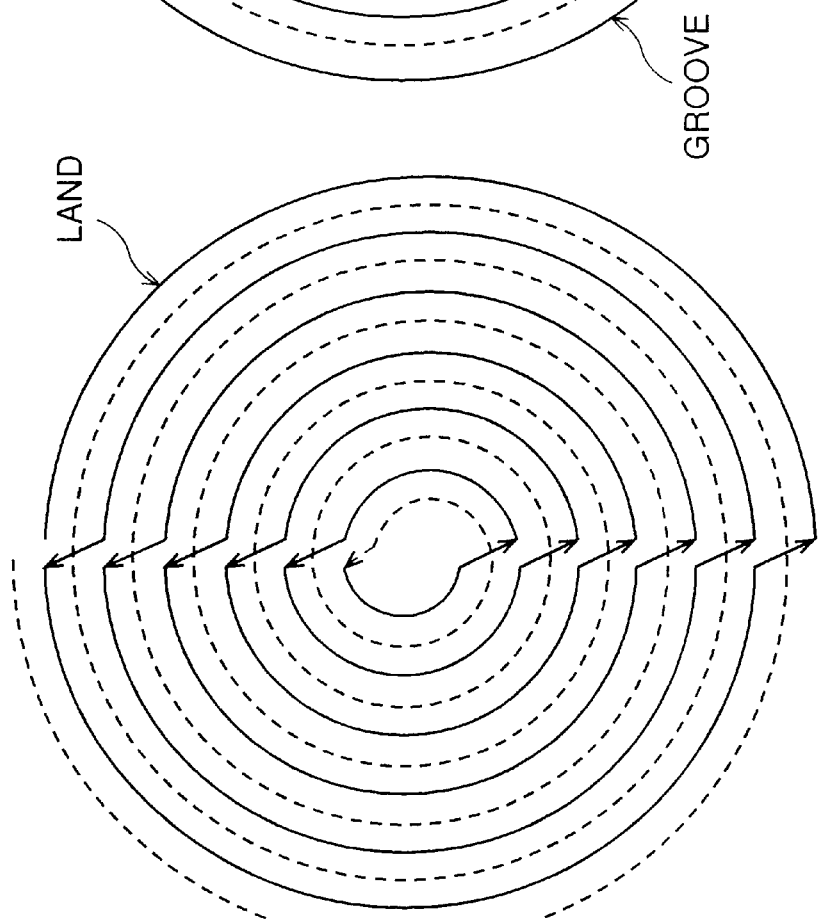
Figure 12:
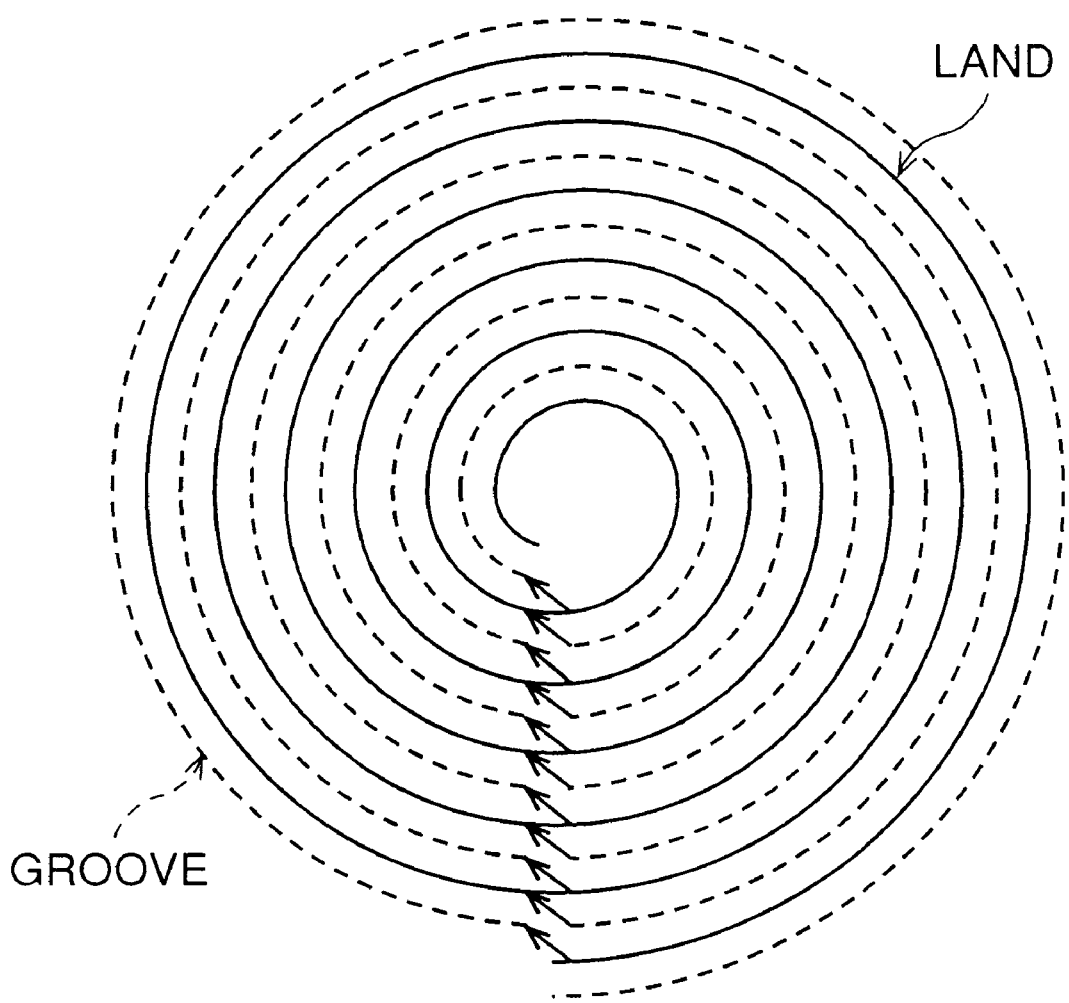
FIG. 12 shows land tracks and groove tracks scanned by a conventional method.

FIGS. 11A and 11B show an alternative procedure in which the head scans the outermost groove track to the innermost groove track without any track jump, and then scans the innermost land track to the outermost land track while jumping the land tracks forward.

As shown in FIG. 11B, the head records the frames #0 and #1 in the groove track #5, records the frames #2 and #3 in the groove track #4, records the frames #4 and #5 in the groove track 3, records the frames #5 and #6 in the groove track #2, records the frame #7 in the groove track #1, records the frame #8 in the groove track #0, and then jumps one track forward to the leading end of the land track #0.

As shown in FIG. 11A, the head records the former half of the frame #9 from the center of the land track #0, jumps one land track forward, records the latter half of the frame #9 from the leading end of the land track #0, jumps one land track forward, records the former half of the frame #10 from the center of the land track #1, jumps one land track forward, records the latter half of the frame #10 from the leading end of the land track #1, jumps one land track forward, records the former half of the frame from the center of the land track #2, jumps one land track forward, records the latter half of the frame #11 and the former half of the frame #12 from the leading end of the land track #2, jumps one land track forward, records the latter half of the frame #12 and the former half of the frame #13 from the center of the land track #3, jumps one land track forward, records the latter half of the frame #13 from the leading end of the land track #3, jumps one land track forward, records the frame #14 from the center of the land track #4, jumps one land track forward, records the latter half of the frame #15 from the leading end of the land track #4, jumps one land track forward, records the frame #16 from the center of the land track #5, and then records the frame #17 from the leading end of the land track #5.

As stated above, data can be recorded in or reproduced from an optical disk while causing it to spin at a preselected linear velocity or a preselected angular velocity. Hereinafter will be described a procedure for recording a video signal in an optical disk by way of example.

A video signal is input to an optical disk drive at a constant rate and recorded in the disk at a variable rate. A buffer intervenes between the data input to the disk drive and the data written to the disk. Assume that the amount of data stored in the buffer usually remains in a preselected range. Then, in FIGS. 6A and 6B, when the amount of data in the buffer decreases below the lower limit of the above range, the head stops recording, in the case of land tracks, one track and then jumps one land track backward or stops recording, in the case of groove tracks, one track and then jumps one groove track backward. In FIGS. 10A and 10B, the head stops recording, in the case of groove tracks, one groove track and then jumps one groove track backward or stops recording, in the case of land tracks, one land track and then jumps one land track forward.

A reproducing procedure is as follows. A video signal is reproduced from an optical disk at a variable rate and output from an optical disk drive at a constant rate. A buffer intervenes between the data read out of the disk and the data output from the disk drive. Again, assume that the amount of data stored in the buffer usually remains in a preselected range. Then, in FIGS. 6A and 6B, when the amount of data in the buffer increases above the upper limit of the above range, the head stops recording, in the case of land tracks, one track and then jumps one land track backward or stops recording, in the case of groove tracks, one track and then jumps one groove track backward. In FIGS. 10A and 10B, the head stops recording, in the case of groove tracks, one groove track and then jumps one groove rack backward or stops recording, in the case of land tracks, one land track and then jumps one land track forward.

Another specific procedure for recording a video signal is as follows. A video signal is input to an optical disk drive at a constant rate and recorded in the disk at a variable rate. A buffer intervenes between the data input to the disk drive and the data written to the disk. Assume that the amount of data stored in the buffer usually remains in a preselected range. Then, in FIGS. 8A and 8B, when the amount of data in the buffer decreases below the lower limit of the above range, the head stops recording, in the case of land tracks, one track and then jumps one land track backward or stops recording, in the case of groove tracks, one track, but does not jump any track. In FIGS. 11A and 11B, the head stops recording, in the case of groove tracks, one track and then jumps one land track backward, but does not jump any track.

A reproducing procedure is as follows. A video signal is reproduced from an optical disk at a variable rate and output from an optical disk drive at a constant rate. A buffer intervenes between the data read out of the disk and the data output from the disk drive. Again, assume that the amount of data stored in the buffer usually remains in a preselected range. Then, in FIGS. 8A and 8B, when the amount of data in the buffer increases above the upper limit of the above range, the head stops recording, in the case of land tracks, one track and then jumps one land track backward or stops recording, in the case of groove tracks, one track, but does not jump any track. In FIGS. 11A and 11B, the head stops recording, in the case of groove tracks, one track and then jumps one groove track backward, but does not jump any track.

Now, data cannot be written to the positions where truck jumps occur, and data written to such positions cannot be read out. The requisite is therefore that data cannot written to the track jump positions or that invalid data be written to the track jump positions. Assume that data having an adequate reversal interval for implementing bit synchronization as far as possible is recorded in each track jump position. Let such data be referred to as a track jump interval. The track jump interval must be followed by a preamble for detecting the bit synchronization of data and sync block synchronization.

In FIGS. 6A and 6B, the track jump occurs at one position in each track, and therefore a track jump interval, track address and preamble are also written to one position of each track. For the land tracks where the track jump usually does not occur, the track jump interval or the preamble may be reduced in length. Also, for the groove tracks where the track jump usually occurs, the track jump or the preamble may be increased in length.

In FIGS. 8A and 8B, because the track jump occurs at two positions in each track, the track jump interval, track address and preamble may be written to two positions in each track, or the track address and the track jump interval and preamble may be written to one position and two positions, respectively. In this case, the track jump interval and preamble may be implemented as the same data. For the land tracks where the track jump usually does not occur, the track jump interval or the preamble may be reduced in length. Also, for the groove tracks where the track jump usually occurs, the track jump interval or the preamble may be increased in length.

Likewise, in FIGS. 8A and 8B, the track jump occurs only in the groove tracks, at two positions in each track. Therefore, the tack jump interval, track address and preamble may be written to one position in each land track or to two positions in each groove track. Alternatively, only in each groove track, the track address may be written to one position while the track jump interval and preamble may be written to two positions. Again, the track jump interval and preamble may be implemented as the same data. Because the track jump usually does not occur in the land tracks, the track jump interval or the preamble may be reduced in length. For the groove tracks where the track jump usually occurs, the track jump interval or the preamble may be increased in length.

It is to be noted that the embodiments described above each is capable of recording and reproducing data in the same manner. Also, in the foregoing description of the embodiments, the land tracks and groove tracks may be replaced with each other.

Figure 14:
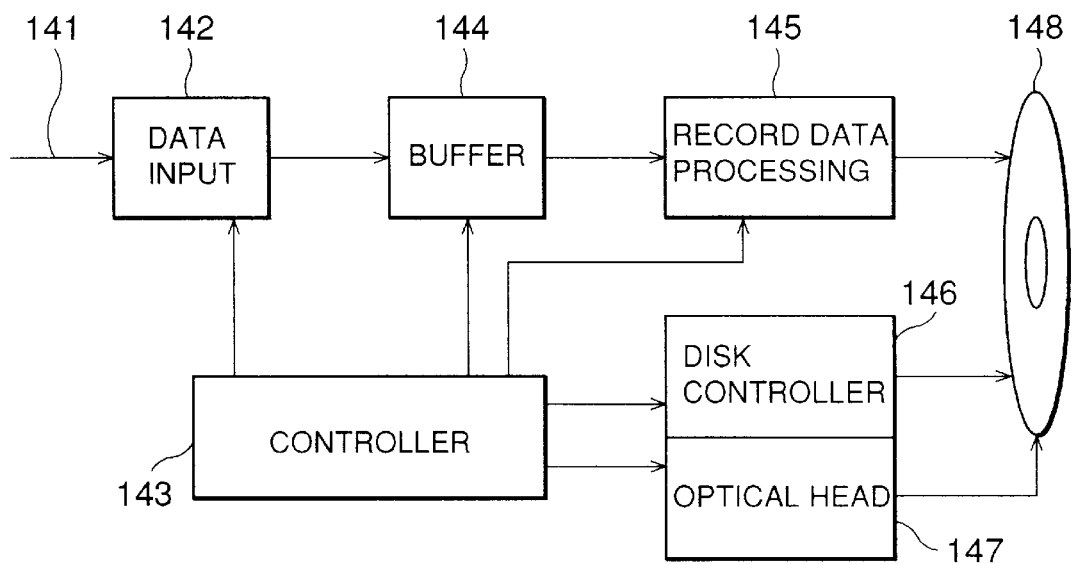
FIG. 14 is a block diagram schematically showing a recording circuit for practicing any one of recording methods particular to the present invention.

FIG. 14 shows a recording circuit for practicing any one of the recording procedures described above. As shown, image data 141 are input to a dada input 142 and processed thereby. A controller 143 controls the operation of the entire recording circuit. A buffer 144 absorbs the difference between the input data rate and the record data rate. A record data processing 145 selects a record area number so as to prevent the buffer 144 from overflowing or underflowing and sends record data to an optical disk 148. A disk controller 146 causes the disk 148 to spin. The reference numeral 147 designates an optical head.

Figure 15:
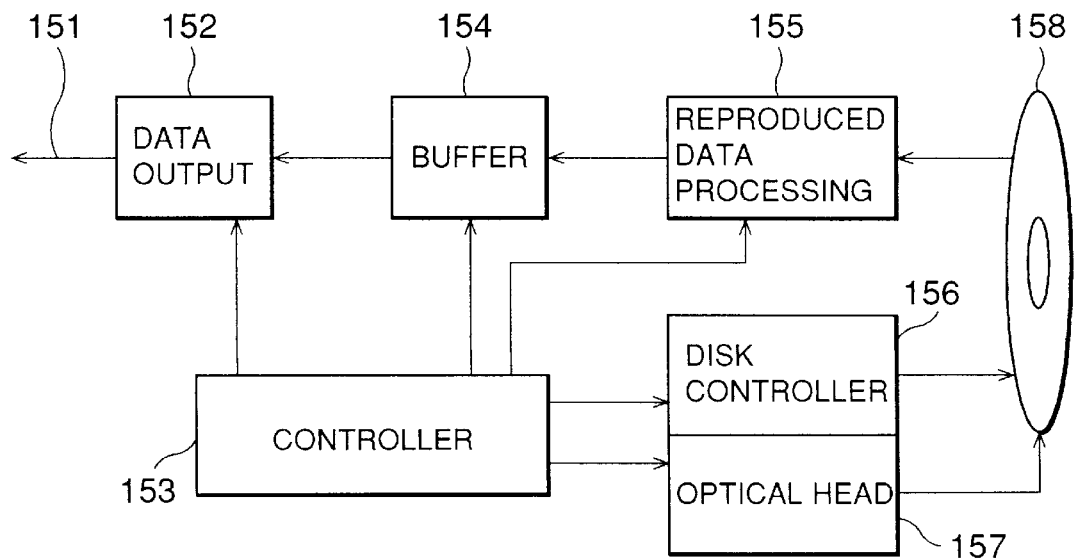
FIG. 15 is a block diagram schematically showing a reproducing circuit for practicing any one of reproducing methods also particular to the present invention.

FIG. 15 shows a reproducing circuit for practicing any one of the reproducing procedures shown and described. As shown, image data 151 are processed by a data output 152 and then fed out to the outside. A controller 153 controls the operation of the entire reproducing circuit. A buffer 154 absorbs the difference between the output data rate and the reproduction data rate. A reproduced data processing 155 selects a record area number so as to prevent the buffer 154 from overflowing or underflowing and reads data out of an optical disk 158. A disk controller 156 causes the disk 158 to spin. The reference numeral 157 designates an optical head.

Other preferred embodiments of the present invention will be described hereinafter.

(1) A record area is equally divided on an m track basis. An A frame of data for a track, i.e., mA frames of data in total are recorded in the radially innermost area #0. (A+B) frames of data for a track, i.e., m(A+B) frames of data are recorded in the area #1. (A+nB) frames of data for a track, i.e., m(A+nB) frames of data in total are recorded in the radially outermost area #n. Such data are continuously recorded only in the land tracks of the areas #0 through #n. Subsequently, a one-track backward jump is effected to the nearest, but inward, groove track. Then, (A+nB) frames of data for a track, i.e., m(A+nB) frames of data in total are recorded in the outermost area #n. [A+(n−1)B] frames of data for a track, i.e., m[A+(n−1)B] frames of data in total are recorded in the area #(n−1) . An A frame of data for a track, i.e., mA frames of data in total are recorded in the innermost area #0. During the recording from the outermost area #n to the innermost area #0, a two-track backward jump is effected eve y time a track is scanned. In this manner, the number of record bits for a track is distributed in each record area in proportion to the radius of a disk, realizing a constant record wavelength. In addition, all the land tracks and groove tracks can be recorded or reproduced while effecting track jumps only in the groove tracks.

(2) In the above configuration (1), after data have been recorded up to the outermost land track, a one-track backward jump is effected to the nearest, but inward, groove track. Subsequently, recording or reproduction is effected up to the innermost groove track while repeating a one-track backward jump every time half a track is scanned.

(3) A record area is equally divided on an m track basis. An (A+nB) frames of data for a track, i.e., m(A+nB) frames of data in total are recorded in the radially outermost area #n. [A+(n−1)B] frames of data for a track, i.e., m[A+(n−1)B] frames of data in total are recorded in the area #(n−1). An A frame of data for a track, i.e., mA frames of data in total are recorded in the innermost area #0. Such data are continuously recorded only in the land tracks of the areas #n through #0. Subsequently, a one-track backward jump is effected to the nearest, but inward, groove track. Then, an A frame of data for a track, i.e., mA frames of data in total are recorded in the innermost area #0. (A+nB) frames of data for a track, i.e., m(A+nB) frames of data in total are recorded in the outermost area #1. (A+nB) frames of data for a track, i.e., m(A+nB) frames of data in total are recorded in the outermost area #n. During the recording from the innermost area #0 to the outermost area #n, a two-track backward jump is effected every time a track is scanned. In this manner, the number of record bits for a track is distributed in each record area in proportion to the radius of a disk, realizing a constant record wavelength. In addition, all the land tracks and groove tracks can be recorded or reproduced while effecting track jumps only in the groove tracks.

(4) In the configuration (3), after data have been recorded up to the innermost land track, a one-track forward jump is effected to the nearest, but inward, groove track. Subsequently, recording or reproduction is effected up to the outermost groove track while repeating a one-track forward jump every time half a track is scanned.

(5) In any one of the configurations (1) through (4), recording or reproduction is effected by causing an optical disk to spin at a constant linear velocity.

(6) In the configuration (1) or (3), an optical disk is caused to spin at a constant angular velocity. During recording, a buffer intervenes between input data of constant rate and record data of variable rate. During reproduction, a buffer intervenes between reproduced data of variable rate and output data of constant rate. When the buffer assigned to recording underflows or when the buffer assigned to reproduction overflows, recording is interrupted, in the case of land tracks, by one land track and followed by a one-track backward jump or interrupted, in the case of groove tracks, by one track and followed by a one-track backward or forward jump.

(7) In the configuration (2) or (4), an optical disk is caused to spin at a constant angular velocity. During recording, a buffer intervenes between input data of constant rate and record data of variable rate. During reproduction, a buffer intervenes between reproduced data of variable rate and output data of constant rate. When the buffer assigned to recording underflows or when the buffer assigned to reproduction overflows, recording is interrupted, in the case of land tracks, by one land track and followed by a one-track backward jump or interrupted, in the case of groove tracks, by one track and followed by a one-track ump.

(8) In the configuration (1) or (3), an interval area for a track jump and existing in one position in each track or a preamble area for locking synchronization and clock is longer in groove tracks than in land tracks.

(9) In the configuration (2) or (4), an interval area for a track jump, a preamble area for locking synchronization and clock, or a track address is provided at the leading end and the center of each track.

(10) In the configuration (9), each interval area or each preamble area is longer in the groove tracks than in the land tracks.

(11) In the configuration (2) or (4), an interval area for a track jump, a preamble area for locking synchronization and clock, or a track address is provided at the leading end of each land track and at the leading end and the center of each groove track.

(12) In the configuration (11), each interval area or each preamble area is longer in the groove tracks than in the land tracks.

(13) In any one of the configurations (1) through (12), the land tracks and grooves tracks are replaced with each other as to processing.

In summary, it will be seen that the present invention provides an optical disk scanning method insuring stable track jumps because continuous reproduction occurs in one of a land area and a groove area and because track jumps occur only in the other area. Further, the method of the invention reduces the frequency and width of track jump and can surely read track markers despite the repeated track jump. Also, the present invention provides an optical disk scanning apparatus for practicing the above method.

Various modifications will become possible for those skilled in the art after receiving the teachings of the present disclosure without departing from the scope thereof.

What is claimed is:

1. A method of scanning an optical disk having a land area and a groove area respectively arranged in a double spiral configuration on a common surface of said optical disk, comprising the steps of:

first scanning either an entire one of said land area and said groove area continuously radially inward or radially outward; and second scanning the other of said land area and said groove area continuously radially outward or radially inward while performing a track jump at a predetermined interval between tracks of said other one of said land area and said groove area while said second scanning.

2. A method as claimed in claim 1, wherein in said other one of said land area and said groove area where the track jump occurs, a two-track jump is repeated every time a track is scanned.

3. A method as claimed in claim 1, wherein in said other one of aid land area or said groove area where the track jump occurs, a one-track jump is repeated every time half a track is scanned.

4. A method as claimed in claim 1, wherein a track marker in said other one of said land area and said groove area is broader than in the one of said land area and said groove area.

5. In an apparatus for scanning an optical disk having a land area and a groove area respectively arranged in a double spiral configuration on a common surface of said optical disk, either one of said land area and said groove area is continuously scanned radially inward or radially outward as a whole, and the other one of said land area and said groove area is second scanned continuously radially outward or radially inward with repetition of a track jump at a predetermined interval between tracks of said other one of said land area and said groove area while said second scanning.

6. A method as claimed in claim 2, wherein a track marker is broader in said land area or said groove area where the track jump occurs than in the other area.

7. A method as claimed in claim 3, wherein a track marker is broader in said land area or said groove area where the track jump occurs than in the other area.

8. A method of scanning an optical disk having a first recording area and a second recording area arranged in a double spiral configuration on a common surface of said optical disk, comprising the steps of:

scanning continuously an entire first recording area in a first radial direction; and scanning continuously the second recording area in a second radial direction opposite said first radial direction, said scanning said second recording area being scanned while periodically repeating a track jump at predetermined intervals between tracks of said second recording area and thereby skipping over said first recording area.

9. The method of claim 8, wherein:

said first recording area is one of a land area and a groove area, and said second recording area is the other of said land area and said groove area.

10. The method of claim 8, wherein said first radial direction is an inward radial direction and said second radial direction is an outward radial direction.

11. The method of claim 8, wherein said first radial direction is an outward radial direction and said second radial direction is an inward radial direction.

* * * * *